United States Patent
Kamath et al.

(10) Patent No.: US 9,754,232 B2
(45) Date of Patent: Sep. 5, 2017

(54) SYSTEM AND METHOD FOR SOLVING LARGE SCALE SUPPLY CHAIN PLANNING PROBLEMS WITH INTEGER CONSTRAINTS

(71) Applicant: JDA Software Group, Inc., Scottsdale, AZ (US)

(72) Inventors: Narasimha B Kamath, Bangalore (IN); Tushar Shekhar, Bangalore (IN)

(73) Assignee: JDA Software Group, Inc., Scottsdale, AZ (US)

( * ) Notice: Subject to any disclaimer, the term of this patent is extended or adjusted under 35 U.S.C. 154(b) by 6 days.

(21) Appl. No.: 13/867,310

(22) Filed: Apr. 22, 2013

(65) Prior Publication Data

US 2013/0238385 A1  Sep. 12, 2013

Related U.S. Application Data

(63) Continuation of application No. 12/860,683, filed on Aug. 20, 2010, now Pat. No. 8,429,035.

(60) Provisional application No. 61/237,029, filed on Aug. 26, 2009.

(51) Int. Cl.
  *G06Q 10/06* (2012.01)
(52) U.S. Cl.
  CPC ......... *G06Q 10/0633* (2013.01); *G06Q 10/06* (2013.01)
(58) Field of Classification Search
  CPC ............... G06Q 10/06; G06Q 10/0633; G06Q 10/06375; G06Q 10/0637; G06Q 30/0202
  USPC ...................... 705/28, 348, 7.27; 700/102, 97
  See application file for complete search history.

(56) References Cited

U.S. PATENT DOCUMENTS

| | | | |
|---|---|---|---|
| 7,117,130 B1 | 10/2006 | Megiddo | |
| 7,191,140 B2 | 3/2007 | Yu et al. | |
| 7,292,904 B2 | 11/2007 | Denton et al. | |
| 7,444,477 B2 | 10/2008 | Yang et al. | |
| 7,672,862 B1* | 3/2010 | Venkatasubramanyan | G06Q 10/06312 705/7.22 |
| 7,738,984 B2 | 6/2010 | Denton et al. | |
| 7,801,754 B2* | 9/2010 | Kasper | G06Q 10/04 705/7.12 |
| 7,917,379 B1 | 3/2011 | Burkhardt et al. | |
| 2002/0019759 A1* | 2/2002 | Arunapuram et al. | 705/7 |

(Continued)

OTHER PUBLICATIONS

Rothberg, Edward, "An Evolutionary Algorithm for Polishing Mixed Integer Programming Solutions," INFORMS Journal of Computing, vol. 19, No. 4, pp. 534-541, Fall 2007.

*Primary Examiner* — Vanel Frenel
(74) *Attorney, Agent, or Firm* — Jackson White, PC; Steven J. Laureanti

(57) ABSTRACT

A system and method is disclosed for solving supply chain planning problems. The system includes a database that stores data representing a planning problem of a supply chain network and a computer that accesses the planning problem of the supply chain network stored in the database and models the planning problem as a network of nodes and edges. The computer further generates a hierarchical linear programming solution of the planning problem and applies advanced heuristics to the generated hierarchical linear programming solution. The computer still further formulates a mixed integer program to generate an optimized global hierarchical solution and stores the generated optimized global hierarchical solution in the database.

20 Claims, 4 Drawing Sheets

(56) References Cited

U.S. PATENT DOCUMENTS

2004/0205074 A1* 10/2004 Berkery et al. ............... 707/100
2008/0221960 A1   9/2008 Moorkanat et al.
2008/0243570 A1  10/2008 Moorkanat et al.

* cited by examiner

SYSTEM AND METHOD FOR SOLVING LARGE SCALE SUPPLY CHAIN PLANNING PROBLEMS WITH INTEGER CONSTRAINTS

CROSS-REFERENCE TO RELATED APPLICATIONS

This application is a continuation of U.S. patent application Ser. No. 12/860,683 filed on 20 Aug. 2010 and entitled "System and Method of Solving Large Scale Supply Chain Planning Problems with Integer Constraints," which claims the benefit of U.S. Provisional Application Ser. No. 61/237,029, filed 26 Aug. 2009, and entitled "System and Method for Solving Large Scale Supply Chain Planning Problems with Integer Constraints." U.S. patent application Ser. No. 12/860,683 and U.S. Provisional Patent Application Ser. No. 61/237,029 are assigned to the assignee of the present application. The disclosed of related U.S. patent application Ser. No. 12/860,683 and U.S. Provisional Patent Application Ser. No. 61/237,029 are hereby incorporated by reference into the present disclosure as if fully set forth herein.

TECHNICAL FIELD OF THE INVENTION

This invention relates generally to computer implementable decision support system for obtaining feasible supply chain plans honoring discrete lot-sizing rules, production constraints and operational objectives, and more particularly to a system and method for solving large scale supply chain planning problems with integer constraints.

BACKGROUND OF THE INVENTION

A supply chain network consists of procuring raw materials from vendors, processing the materials and delivering products to warehouses, retailers, suppliers, and/or customers. Entities within the supply chain network attempt to solve supply chain planning problems according to various objectives. Traditionally, there have been two methods for solving supply chain planning problems. The first method is to decompose the problem into an objective hierarchy and solve the problem using linear programming (LP) for each objective level. However, this method is inadequate because it does not handle discrete constraints, such as, for example, capacity, lot-sizing, setups, and the like. The second method is to use an order-by-order solver, in which each order is processed one after the other based on the orders priority. However, this method is also inadequate because it is sequence based and does not provide for, among other things, global optimization.

In addition, there have been two categories of methods proposed to attempt to resolve the shortcoming in the prior art of not being able to handle discrete constraints. The first method is to formulate the problem as a mixed integer program (MIP). However, this method is inadequate because it falls into the class of problems called NP-hard which means that the solution is not scalable for large datasets and furthermore, the run times for obtaining even a single solution is very high. The second method is to use heuristics to repair the LP solution. However, this method is also inadequate because it uses heuristics and does not account for the functional hierarchy of objectives. That is, this second method uses local cleanup to come up with a solution, usually by rounding up or down the integer values, without violating the constraints. Sometimes this is followed by fixing all the integer variables at its post-heuristic value and re-optimizing the hierarchy of objective functions. This, however, severely limits the ability of re-optimization to achieve global optimization and is also inadequate. Therefore, previous methods for solving supply chain planning problems have proven inadequate.

SUMMARY OF THE INVENTION

A system for solving supply chain planning problems is disclosed. The system includes solving supply chain planning problems and a computer configured to access the planning problem of the supply chain network stored in the database and model the planning problem as a network of nodes and edges. The computer is further configured to generate a hierarchical linear programming solution of the planning problem and apply advanced heuristics to the generated hierarchical linear programming solution. The computer is still further configured to formulate a mixed integer program to generate an optimized global hierarchical solution and store the generated optimized global hierarchical solution in the database.

A method of solving supply chain planning problems is also disclosed. The method provides for accessing a planning problem of a supply chain network stored in a database and modeling the planning problem as a network of nodes and edges. The method further provides for generating a hierarchical linear programming solution of the planning problem and applying advanced heuristics to the generated hierarchical linear programming solution. The method still further provides for formulating a mixed integer program to generate an optimized global hierarchical solution and storing the generated optimized global hierarchical solution in the database.

A computer-readable medium embodied with software for solving supply chain planning problems is also disclosed. The software when executed using one or more computers is configured to access a planning problem of a supply chain network stored in a database and model the planning problem as a network of nodes and edges. The software is further configured to generate a hierarchical linear programming solution of the planning problem and apply advanced heuristics to the generated hierarchical linear programming solution. The software is still further configured to formulate a mixed integer program to generate an optimized global hierarchical solution and store the generated optimized global hierarchical solution in the database.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
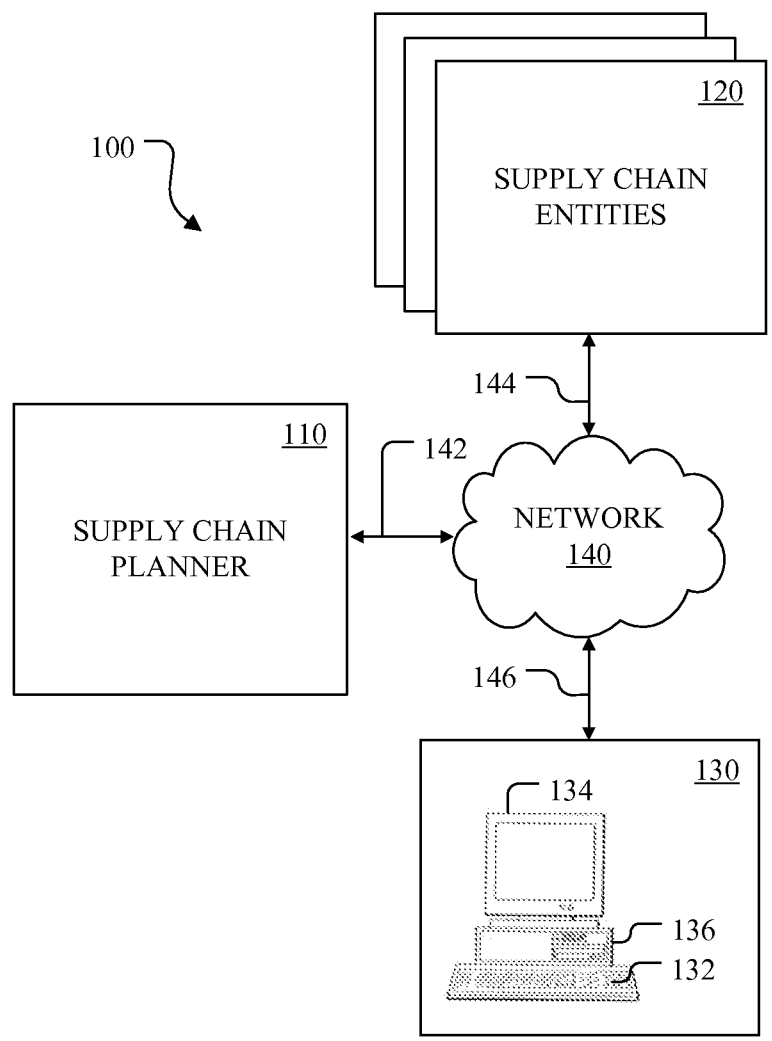
FIG. 1 illustrates an exemplary supply chain network according to a preferred embodiment.

FIG. 1 illustrates an exemplary supply chain network 100 according to a preferred embodiment. Supply chain network 100 comprises supply chain planner 110, one or more supply chain entities 120, computers 130, a network 140, and communication links 142, 144, and 146. Although a single supply chain planner 110, one or more supply chain entities 120, a single computer 130, and a single network 140, are shown and described; embodiments contemplate any number of supply chain planners 110, any number of supply chain entities 120, any number of computers 130, or any number of networks 140, according to particular needs.

In a preferred embodiment, supply chain network 100 exploits the efficiency of a hierarchical optimization technique and a global optimization of a mixed integer program (MIP) to provide a global hierarchical solution for complex large scale supply chain planning problems of supply chain network 100. In addition, as described below in more detail, supply chain planner 110 takes a hierarchical linear programming (LP) solution as a base, applies advanced heuristics to obtain a good integer solution and uses this solution to formulate a mixed integer program (MIP) which determines an optimized global hierarchical solution.

In one embodiment, supply chain planner 110 considers various discrete decision variables, discrete lot-sizing rules, production constraints and operational/business objectives of one or more supply chain entities 120 when determining an optimized global hierarchical solution. As described below in more detail, these various discrete decision variables, discrete lot-sizing rules, production constraints and operational/business objectives may prevent one or more supply chain entities 120 from satisfying supply chain demand, and may delay supply chain demand from being satisfied during a particular planning horizon. In addition, or as an alternative, the operational/business objectives of one or more supply chain entities 120 may include, but are not limited to, meeting various types of demand, adhering to safety stock limits, minimizing inventory, reducing backlog, obtaining a particular product mix, maintaining proportionality, reducing use of alternate items, optimizing profit.

In addition, these various optimal solutions are associated with one or more supply chain planning problems of supply chain network 100, and may include an optimized global hierarchical solution represented by a set of operations to be performed across a particular planning horizon. Although, supply chain network 100 is shown and described as associated with one or more supply chain entities 120, supply chain network 100 may provide an optimized global hierarchical solution to any number of supply chain entities, according to particular needs.

Supply chain network 100 may operate on one or more computers 130 that are integral to or separate from the hardware and/or software that support supply chain planner 110 and one or more supply chain entities 120. Computers 130 may include any suitable input device 132, such as a keypad, mouse, touch screen, microphone, or other device to input information. An output device 134 may convey information associated with the operation of supply chain network 100, including digital or analog data, visual information, or audio information. Computers 130 may include fixed or removable computer-readable storage media, such as magnetic computer disks, CD-ROM, or other suitable computer-readable storage media to receive output from and provide input to supply chain network 100. Computers 130 may include one or more processors 136 and associated memory to execute instructions and manipulate information according to the operation of supply chain network 100.

Although a single computer 130 is shown in FIG. 1, supply chain planner 110 and one or more supply chain entities 120 may each operate on separate computers 130 or may operate on one or more shared computers 130. Each of the one or more computers 130 may be a work station, personal computer (PC), network computer, notebook computer, personal digital assistant (PDA), cell phone, telephone, wireless data port, or any other suitable computing device.

In one embodiment, supply chain planner 110 is coupled with network 140 using communications link 142, which may be any wireline, wireless, or other link suitable to support data communications between supply chain planner 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146 are shown as generally coupling supply chain planner 110, one or more supply chain entities 120, and computers 130 to network 140, supply chain planner 110, one or more supply chain entities 120, and computers 130 may communicate directly with supply chain planner 110, one or more supply chain entities 120, and computers 130, according to particular needs.

In another embodiment, network 140 includes the Internet and any appropriate local area networks (LANs), metropolitan area networks (MANS), or wide area networks (WANs) coupling supply chain planner 110, one or more supply chain entities 120, and computers 130. For example, data may be maintained by supply chain planner 110 at one or more locations external to supply chain planner 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

In accordance with the principles of embodiments of the present invention, supply chain planner 110 obtains feasible supply chain plans honoring discrete lot-sizing rules, production constraints and operational/business objectives. Supply chain planner 110 further solves complex planning requirements efficiently by modeling the one or more supply planning problems of supply chain network 100 as a LP problem and modeling multiple business objectives as a hierarchy of linear objective functions and discrete decision variables which are included in the model as integer variables and solved as a mixed integer program (MIP). Furthermore, supply chain planner 110 seamlessly integrates the use of LP, advanced heuristics and MIP to provide an optimized global hierarchical solution for complex large scale discrete supply chain planning problems, as discussed in more detail below.

Figure 2:
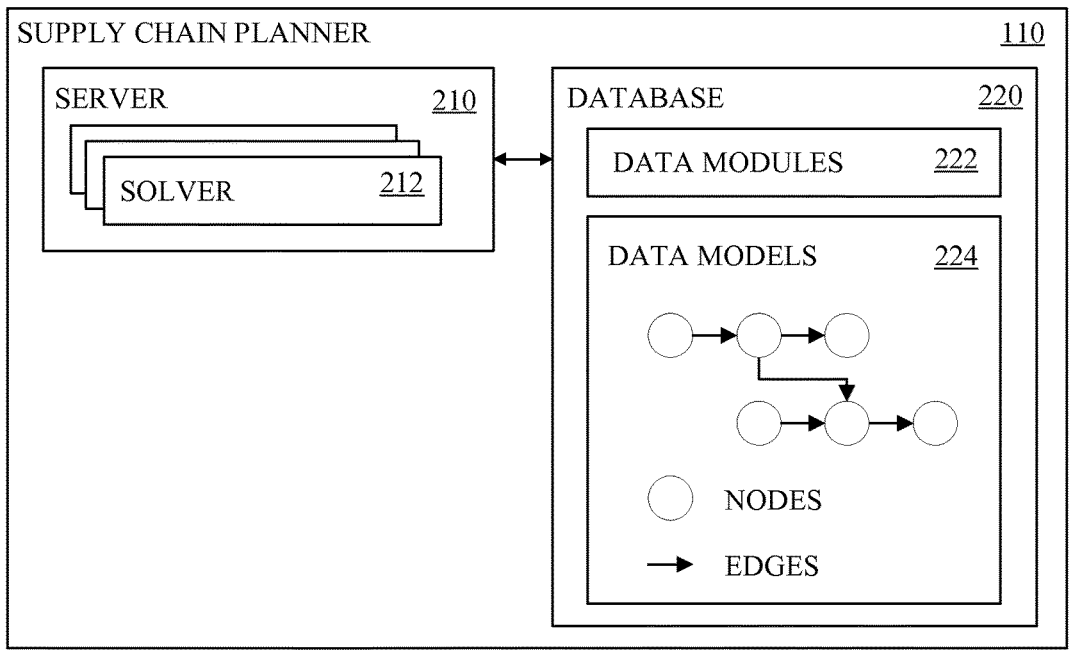
FIG. 2 illustrates the supply chain planner of FIG. 1 in greater detail in accordance with the preferred embodiment.

FIG. 2 illustrates supply chain planner 110 of FIG. 1 in greater detail in accordance with the preferred embodiment. As discussed above, supply chain planner 110 comprises one or more computers at one or more locations including associated input devices, output devices, mass computer-readable storage media, processors, memory, or other components for receiving, processing, storing, and communicating information according to the operation of supply chain network 100. In an embodiment, supply chain planner 110 stores and retrieves data representing supply chain planning problem of supply chain network 100, in database 220.

As discussed in more detail below, server 210, which may operate on one or more computers, comprises one or more solvers 212 to generate, among other things, an optimized global hierarchical solution of one or more supply chain planning problems of supply chain network 100. In addition, although server 210 is shown and described as comprising one or more solvers 212, embodiments contemplate any suitable solver or combination of solvers, according to particular needs.

Database 220 comprises one or more databases or other data storage arrangements at one or more locations, local to, or remote from, server 210. Database 220 includes, for example, one or more data modules 222 and one or more data models 224. As an example only and not by way of limitation, database 220 stores supply chain data, including one or more supply chain planning problems of supply chain network 100 that may be used by server 210, and in particular, by one or more solvers 212. Data stored in one or more data modules 222 may be, for example, various discrete decision variables, discrete lot-sizing rules, production constraints and operational/business objectives of one or more supply chain entities 120.

As discussed in more detail below, supply chain planner 110 models one or more supply chain planning problems of supply chain network 100. That is, one or more solvers 212 of server 210 represents one or more supply chain entities 120 related to one or more supply chain planning problems, in terms of a network of nodes and edges. In addition, or as an alternative, supply chain planner 110 models the one or more supply chain planning problems of one or more supply chain entities 120 to represent the flow of materials through supply chain network 100. In addition, supply chain network 100, including the one or more supply chain planning problems is valid for a particular period of interest, i.e., a planning horizon. In addition and as discussed above, supply chain planner 110 generates an optimized global hierarchical solution for one or more complex large scale discrete supply chain planning problems of supply chain network 100.

Figure 3:
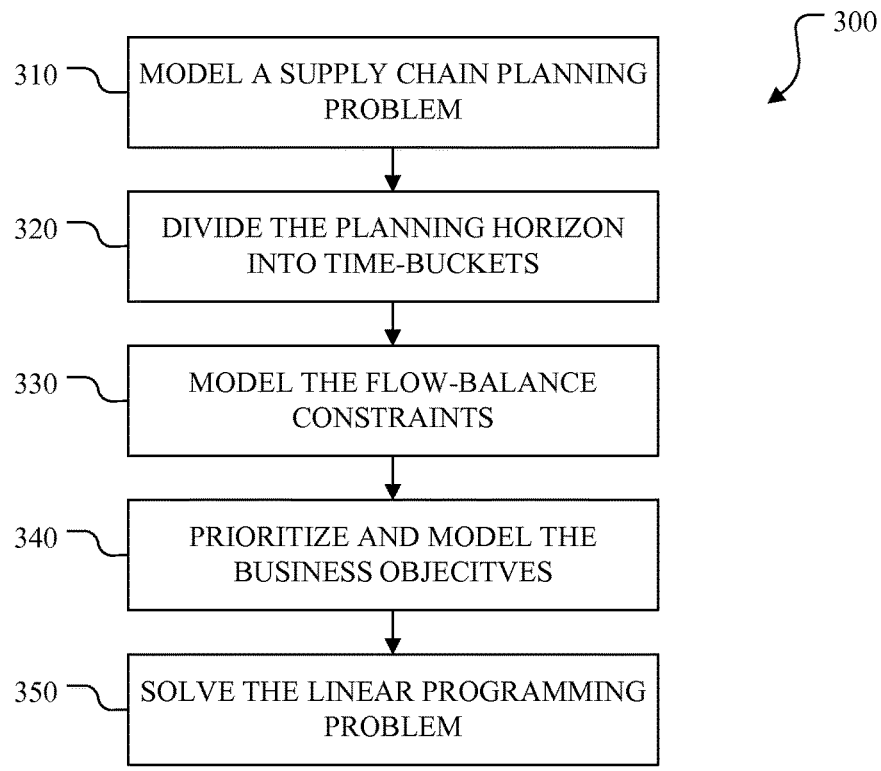
FIG. 3 illustrates an exemplary method of hierarchical optimization of supply chain planning problems.

FIG. 3 illustrates an exemplary method 300 of hierarchical optimization of one or more supply chain planning problems of supply chain network 100. The method begins at step 310 where supply chain planner 110 accesses one or more supply chain planning problems of supply chain network 100 stored in one or more data modules 222. Supply chain planner 110 models the one or more accessed supply chain planning problems as a network of nodes and edges and stores the network of nodes and edges in data models 224. In addition, any material storage/transition units are modeled as nodes, which may be referred to as buffers (i.e.,
a storage unit for material). In addition, supply chain planner 110 models any transportation, manufacturing processes, and/or planned flow of materials as edges that connect the nodes.

In one embodiment, the flow of material over particular periods of time, i.e., planning horizons provides a time-oriented directionality to the network of nodes and edges. The direction relating to a later time in, for example, a manufacturing process may be referred to as the "downstream" direction, while the opposite direction relating to an earlier time in the manufacturing process may be referred to as the "upstream" direction. That is, the network of nodes and edges may be viewed as modeling the manufacture of a product as a flow of materials from one or more raw materials to one or more finished products. The flow of materials in the network of nodes and edges may be in the direction of increasing value (for example, from left to right in a conventional linear timeline) or in the opposite direction, as appropriate according to particular needs.

In addition, or as an alternative, one or more nodes (not having any upstream nodes) represents sources of materials such as raw materials, inventory, work-in-progress, purchase orders, or future procurements from one or more supply chain entities 120. One or more other nodes (not having any downstream nodes) represents customer orders for a product being manufactured. In addition, one or more nodes having at least one upstream and downstream node represent the planned manufacturing operations, each having one or more inputs and one or more outputs (represented by edges).

At step 320, supply chain planner 110 divides the planning horizon into one or more time-units, referred to as time-buckets, i.e., time period intervals. The edge between two buffer nodes denote processing for material and the edge between different buckets for the same buffer indicates inventory carried forward. At step 330, supply chain planner 110 models flow-balance constraints for every buffer in every bucket as material movement in, for example, the entire supply chain network 100. In one embodiment, supply chain planner 110 adds one or more additional constraints of supply chain network 100 to provide for other planning rules.

At step 340, supply chain planner 110 prioritizes and models the business objectives as a hierarchy of objective functions. At step 350, supply chain planner 110 solves the LP problem by, for example, variable fixing, which maintains objective hierarchy. In addition, after every objective function is solved, supply chain planner 110 reviews the reduced costs of the variables. If the reduced cost of a variable is non-zero, supply chain planner 110 fixes that variable at one of its bounds. Among other things, this ensures that optimization of the lower objective function does not degrade the higher objective function. In one embodiment, supply chain planner 110 assumes that all of the objective functions are to be minimized. If any objective function is to be maximized, supply chain planner 110 negates and minimizes the objective function for same effect. Supply chain planner 110 then stores the solved LP problem in database 220.

In addition, although, FIG. 3 illustrates one embodiment of a method of hierarchical optimization of supply chain planning problems of supply chain network 100, various changes may be made to method 300 without departing from the scope of embodiments of the present invention.

Figure 4:
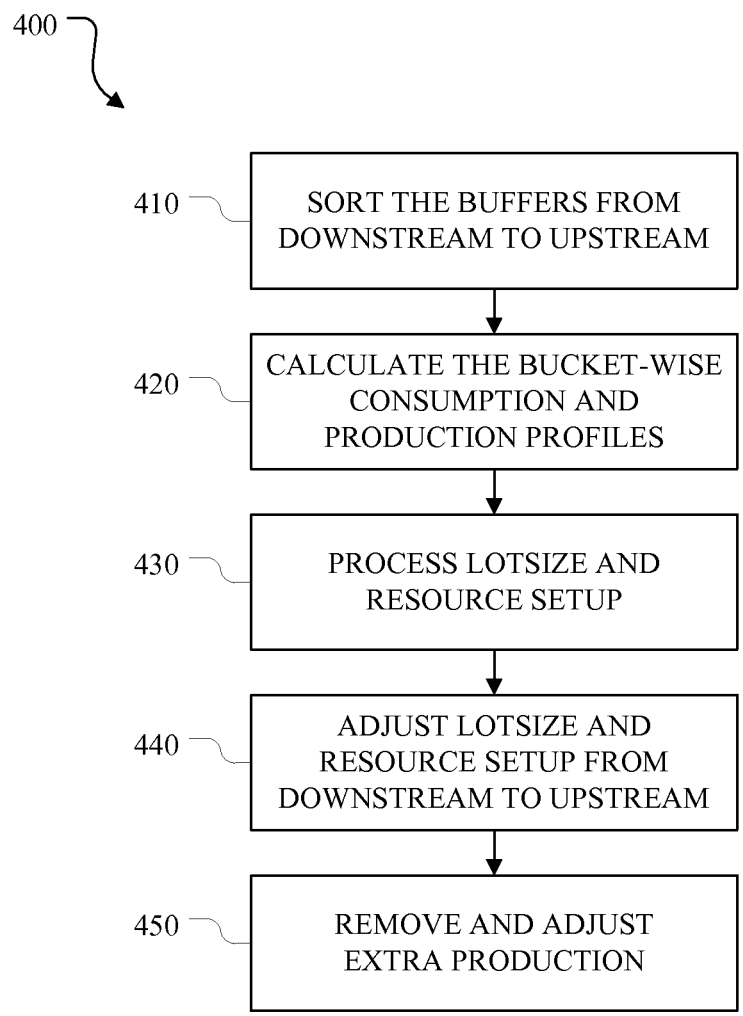
FIG. 4 illustrates an exemplary method of applying advanced heuristics to obtain an integer feasible solution.

FIG. 4 illustrates an exemplary method 400 of applying advanced heuristics to obtain an integer feasible solution of the given hierarchy of objective functions of method 300. As discussed above, the method of variable fixing mentioned in method 300, is not proven to work with integer variables. However, in method 400, supply chain planner 110 utilizes the solution (i.e., the solved LP problem) available in method 300 as, for example, the best available LP solution for the given hierarchy of objective functions. That is, method 400 provides a heuristic that takes the LP solution as a base and assigns feasible integer values to discrete variables.

At step 410 supply chain planner 110 sorts the buffers in the model from downstream to upstream and assigns the buffers levels based on their position in supply chain network 100. For example, in the case of finished goods buffers at the same level, supply chain planner 110 distinguishes these buffers based on the priority of the demand they serve. At step 420, supply chain planner 110 takes the LP solution as a base and calculates the bucket-wise cumulative consumption and cumulative production profiles for each buffer. In one embodiment, supply chain planner 110 starts with the most prioritized downstream buffer and recursively moves upstream.

At step 430, supply chain planner 110 accesses and modifies an inventory profile to start with the most downstream buffer in, for example, its earliest bucket. Based on the supply chain planning problem, it is sequentially processed in every bucket for one buffer or every buffer for one bucket. If, for example, there is any lot-sized consuming operation, supply chain planner 110 updates a desired production profile so as to satisfy the consumption and safety stock requirement on the buffer. In addition, a producing operation considers resource (i.e., physical or temporal constraint on process) availability.

In step 430, supply chain planner determines if the operation (i.e., manufacturing, processing or transportation process) requires any resource setup, if so, then supply chain planner 110 factors it in, at this stage. In addition, in case the production is not sufficient in the required bucket, supply chain planner 110 attempts to produce it in earlier buckets. Furthermore, while moving the production profile, the set earliness for demands, shelf-life and safety stock requirements are factored in. The production profile of each buffer-bucket combination is passed upstream as a consumption profile. At the end of this upsweep, supply chain planner 110 determines a resource feasible integer solution.

At step 440, supply chain planner 110 checks for material availability from, for example, upstream to downstream for each buffer. In one embodiment, if material shortage is encountered, supply chain planner 110 moves the consumption to later buckets, matching the cumulative production profile to cumulative consumption profile in each bucket. In addition, set demand lateness, safety stock requirement, shelf life and the like are also taken into consideration at this point. At the end of this step, supply chain planner 110 determines a material and resource feasible integer solution.

At step 450, any alternate producing operations may be rounded up to the higher lot-size, in case of alternate operations while doing step 440. In this case, the downstream buffers may have excess material higher than a lot-size. Supply chain planner 110 performs an additional sweep starting from the most downstream buffer to clean up any unnecessary excess on buffers. At step 450, supply chain planner 110 determines if the plan is material and resource feasible and stores the integer feasible solution in database 220 and the method ends. In addition, although, FIG. 4 illustrates one embodiment of a method of applying advanced heuristics to obtain an integer feasible solution of the given hierarchy of objective functions of method 300, various changes may be made to method 400 without departing from the scope of embodiments of the present invention.

Figure 5:
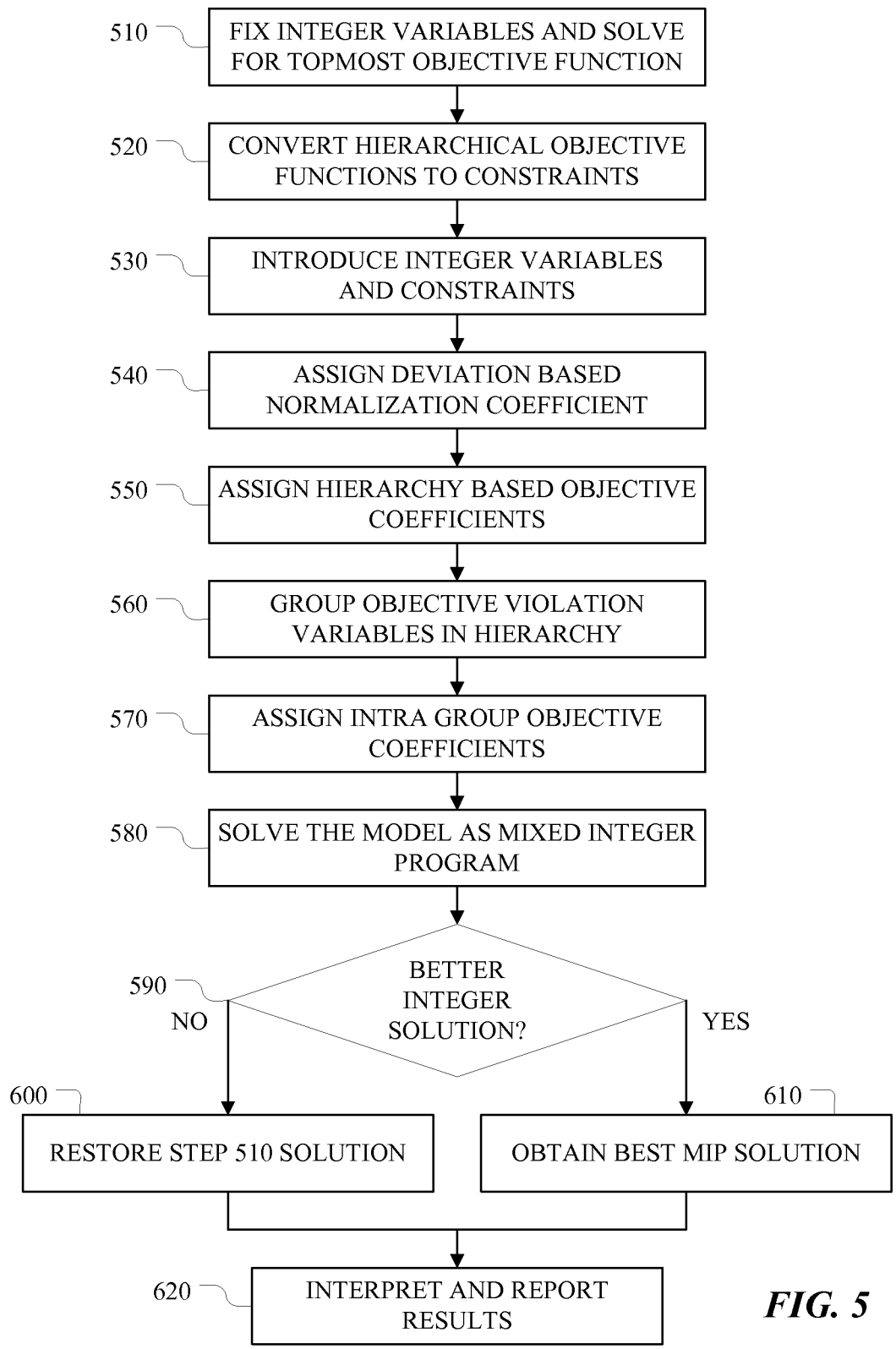
FIG. 5 illustrates an exemplary method of formulating a mixed integer program to solve and restore the objective function hierarchy.

FIG. 5 illustrates an exemplary method 500 of formulating a mixed integer program (MIP) to solve and restore the objective function hierarchy. Supply chain planner 110 accesses and modifies the values of the objective functions based on the modifications made in method 400. In one embodiment, since the LP solution was determined to be the best possible hierarchical solution, the post-heuristic solution is equal or inferior. In another embodiment, the post-processing is aimed at restoring the objective function values to its LP values. However, the post-heuristic solution is based on the LP solution and is constraint feasible, which provides for a good starting point for further optimization, as discussed below. In one embodiment, a good starting solution provides a faster MIP convergence to the optimal solution, wherein the difference in performance is pronounced on large scale problems. In addition, the starting solution may serve as a fallback solution, in some embodiments, when it is difficult to estimate the time required for getting an optimal solution on big problems, i.e., in the case that the MIP solve fails to achieve a better solution within a reasonable time.

The method begins at step 510, in which supply chain planner 110 fixes the integer variables obtained from method 400 and solves for the topmost objective function in a given hierarchy. In this method, the topmost objective function is infinitely more important than the next objective function, in the hierarchical optimization. For example, the second objective function is infinitely more important than the third objective function and so on. In addition, a solution that provides a highest priority to the topmost objective function is considered a good solution. A good solution in turn expedites the subsequent MIP solve. On complex models where there are a lot of side constraints and the heuristic has failed to maintain feasibility beyond material and resource, step 510 serves the purpose of removing infeasibilities. In addition, or as an alternative, in the case that this fixed-integer LP run proves infeasible, all the variables may be unfixed and a subsequent MIP run may be attempted without a starting solution.

At step 520, supply chain planner 110 converts the hierarchical objective functions to constraints by adding slack and surplus variables. That is, supply chain planner 110 calculates values of all the objective functions, based on the solution of step 510. Then, supply chain planner 110 introduces the objective equations as constraints and equates them to the post-LP solution. Slack and Surplus variables are introduced to these constraints, wherein supply chain planner 110 assigns proper values to maintain feasibility. These variables are referred to as Objective Violation Variables (ObSlack$_{(i)}$ and ObSurplus$_{(i)}$).

At step 530, supply chain planner 110 introduces integer variables and integer constraints in the problem and calculates values of all the objective functions, based on the solution of step 510. The objective equations are then introduced as constraints and equated to the post-LP solution. Supply chain planner 110 then introduces Slack and Surplus variables to these constraints and assigns proper values to maintain feasibility. These variables are referred to as Objective Violation Variables (ObSlack$_{(i)}$ and ObSurplus$_{(i)}$).

In addition, and as discussed above, assuming minimization, supply chain planner 110 attempts to bring the objective functions value to post LP solution by minimizing:

Surplus_Only: ObSurplus$_{(i)}$

Also assuming minimization, supply chain planner 110 attempts to improve the solution from the post heuristic values by minimizing:

Surplus_minus_slack: ObSurplus$_{(i)}$–ObSlack$_{(i)}$

At step 540, supply chain planner 110 assigns a deviation based normalization coefficient. In one embodiment, the absolute values of objective constraints may have right hand side (RHS) values in extreme ranges, depending upon the formulation of the hierarchical objective functions. For some objective functions, large change in value of RHS may be relatively insignificant, whereas for some other, even small absolute change in RHS values may be relatively significant. The objective coefficients of the objective violation variables may be modified accordingly to normalize such deviations. For this purpose, the RHS values of all the objective violation constraints are brought to the same scale. Alternatively, this can be achieved by multiplying the objective coefficients of corresponding objective constraints variables with normalization factors. Supply chain planner 110 multiplies the objective constraint by the normalization factor so that the RHS values of each of the objective constraint equation is:

Unit: equal to 1.

Smallest: equal to the smallest absolute value of the objective constraint RHS value.

Largest: equal to the largest absolute value of the objective constraint RHS value.

Mean: equal to the mean of absolute values of the objective constraints RHS values.

Deviation: Obtain normalization factor as (ObSurplus–ObSlack)/(Objective Constraint RHS value)

During step 540 and while normalizing, if the RHS value of any of the objective constraints is zero, it poses difficulty in calculating the normalization coefficient. In such a case, if the post heuristic RHS value is non-zero, supply chain planner 110 uses that value for the purpose of calculating the normalization coefficient. If, however, both the pre-heuristic and post-heuristic RHS value are zero, supply chain planner 110 uses one of the following approaches:

Fix: Fix the objective constraint. It is useful when some functional violations are to be strictly kept at zero.

Reference RHS value: Normalization is performed assuming the RHS value of this constraint to be equal to the reference RHS (smallest, largest, unit, mean).

Unit: Normalization is performed assuming the RHS value of such constraint to be equal to as 1 (One).

At step 550, supply chain planner 110 assigns hierarchy based objective coefficients to the slack/surplus and setup variables. However, it may be difficult to minimize all the objective violation variables to zero due to conflicting nature of objective constraints and additional integer constraints. In such a case, supply chain planner 110 gives the objective violation variables of higher objective functions higher priority. That is, supply chain planner 110 calculates objective coefficients as decreasing exponent of a fixed base. As an example only and not by way of limitation, if there were five objective functions, objective coefficients for corresponding violation variables with the base of 5 would be $5^4$, $5^3$, $5^2$, $5^1$ and $5^0$. Using exponential coefficients has the advantage of maintaining the necessary level of differentiation in objective hierarchy. Hierarchy coefficients are multiplied with the normalization factor for objective coefficients.

At step 560, the hierarchy coefficients may run into extremely large numbers, as evident from step 550, if the number of objective functions is large which may lead to numerical difficulties in the model. In one embodiment, and to overcome this, supply chain planner 110 groups the objective violation variables such that the hierarchy coefficient is the same for the objective violation variables in the same group. In one embodiment, the following options are available:

Uniform: Total number of objective function divided into equal number of groups

Fibonacci: The distinction between objective functions fades going down the hierarchy. This can be utilized to make progressively larger groups of objective functions down the hierarchy. Fibonacci based series is very suitable for this purpose. The top two objective functions are taken individually and subsequent groups contain 2, 3, 5, 8 and so on, objective constraints progressively.

At step 570, supply chain planner 110 assigns intra group objective coefficients. It is recalled from step 560, that each objective coefficient is a multiplication of a hierarchy coefficient and a normalization coefficient. However, there still needs to be a distinction between objective functions in the same group. At the same time, inter-group distinction needs to be significant. To achieve this, supply chain planner 110 divides a fraction of the group coefficient difference equally among the group members, as discussed below in more detail.

In addition, supply chain planner 110 adds setup consumption variables with a uniform coefficient. However, their relative importance vis-à-vis objective violation variables may be maintained by means of a factor. When this factor is kept large, resource setup optimization takes relatively higher precedence over hierarchy optimization. If however, the value of this factor is zero, the setup is simply accounted for but not optimized separately. If one of the objective functions in the hierarchy is to minimize resource consumption, setup is intrinsically minimized.

At step 580, supply chain planner 110 solves the model as a mixed integer program (MIP) during a particular period of time. At step 590, supply chain planner 110 determines whether a better integer solution has been obtained. If so, the method proceeds to step 600, otherwise the method proceeds to step 610. As discussed above, in some embodiments, the starting solution may serve as a fallback solution; therefore, at step 600, supply chain planner 110 restores the solution to the solution obtained in step 510. At step 610, supply chain planner 110 obtains the best integer solution. At step 620, supply chain planner 110 generates an optimized global hierarchical solution and stores the generated solution in database 220.

To further explain the operation of method 500, an example is now given. In this example, the following objective functions hierarchy are assumed, with post LP solve and post heuristic values as given in Table 1:

TABLE 1

| Objective Equation | Post LP Value | Post Heuristic Value |
|---|---|---|
| Obj1 | 1000 | 1200 |
| Obj2 | 90 | 100 |
| Obj3 | 0 | −100 |
| Obj4 | 150 | 0 |
| Obj5 | −5000 | −4500 |
| Obj6 | 0 | 0 |
| Obj7 | 2500 | 2500 |

Supply chain planner 110 forms the objective constraints by adding the objective violation variables as illustrated below:

$Obj1 + ObSlack_1 - ObSurplus_1 = 1000$
$Obj2 + ObSlack_2 - ObSurplus_2 = 90$
$Obj3 + ObSlack_3 - ObSurplus_3 = 0$
$Obj4 + ObSlack_4 - ObSurplus_4 = 150$
$Obj5 + ObSlack_5 - ObSurplus_5 = -5000$
$Obj6 + ObSlack_6 - ObSurplus_6 = 0$
$Obj7 + ObSlack_7 - ObSurplus_7 = 2500$ As discussed above, and as discussed in this example, supply chain planner 110 takes the base of 5 in determining the hierarchy coefficients for the objective violation variables as shown in Table 2:

TABLE 2

| Objective | Uniform Grouping | | |
|---|---|---|---|
| Equation | Group Size 1 | Group Size 3 | Fibonacci Series |
| Obj1 | $5^7$ | $5^3$ | $5^4$ |
| Obj2 | $5^6$ | $5^3$ | $5^3$ |
| Obj3 | $5^5$ | $5^3$ | $5^2$ |
| Obj4 | $5^4$ | $5^2$ | $5^2$ |
| Obj5 | $5^3$ | $5^2$ | $5^1$ |
| Obj6 | $5^2$ | $5^2$ | $5^1$ |
| Obj7 | $5^1$ | $5^1$ | $5^1$ |

In addition, if, as discussed above, there is objective grouping, intra-group modifications are done to the hierarchy coefficient. In this example, the final hierarchy coefficient for the objective constraint (i) is $H_i$, as shown in Table 3:

TABLE 3

| Objective Equation | Group Hierarchy Coefficient | Next Group Hierarchy Coefficient | Calculation of Intra-Group Hierarchy Coefficient | Hierarchy Coefficient after Intra-Group Adjustment ($H_i$) |
|---|---|---|---|---|
| Obj1 | $5^4$ | $5^3$ | $5^4 - (5^3 * (5-1)) * (0/1)$ | 625 |
| Obj2 | $5^3$ | $5^2$ | $5^3 - (5^2 * (5-1)) * (0/1)$ | 125 |
| Obj3 | $5^2$ | $5^1$ | $5^2 - (5^1 * (5-1)) * (0/2)$ | 25 |
| Obj4 | $5^2$ | $5^1$ | $5^2 - (5^1 * (5-1)) * (1/2)$ | 15 |
| Obj5 | $5^1$ | $5^0$ | $5^1 - (5^0 * (5-1)) * (0/3)$ | 5 |
| Obj6 | $5^1$ | $5^0$ | $5^1 - (5^0 * (5-1)) * (1/3)$ | 3.66 |
| Obj7 | $5^1$ | $5^0$ | $5^1 - (5^0 * (5-1)) * (2/3)$ | 2.33 |

As discussed above, supply chain planner 110 modifies the RHS values of the objective constraints to bring them to the same scale. In this example, the normalization coefficient for objective constraint (i) is $N_i$. Table 4 illustrates this calculation:

TABLE 4

| | Normalization Coefficients ($N_i$) | | | | | |
|---|---|---|---|---|---|---|
| Objective Equation | Post LP Value | Post Heuristic Value | Unit abs(RHS) = 1 | Smallest abs(RHS) = 100 | Largest abs(RHS) = 4500 | Mean abs(RHS) = 1200 | Deviation |
| Obj1 | 1000 | 1200 | 1/1200 | 100/1000 | 4500/1000 | 1200/1000 | 200/1000 |
| Obj2 | 90 | 100 | 1/90 | 100/100 | 4500/90 | 1200/90 | 10/90 |
| Obj3 | 0 | -100 | 1/100 | 100/100 | 4500/100 | 1200/100 | 100/100 |
| Obj4 | 150 | 0 | 1/150 | 100/150 | 4500/150 | 1200/150 | 150/150 |
| Obj5 | -5000 | -4500 | 1/5000 | 100/5000 | 4500/5000 | 1200/5000 | 500/5000 |
| Obj6 | 0 | 0 | See Next Table | See Next Table | See Next Table | See Next Table | Fix Constraint |
| Obj7 | 2500 | 2500 | 1/2500 | 100/2500 | 4500/2500 | 1200/2500 | Fix Constraint |

As evident from table 4 and discussed above, supply chain planner 110 cannot apply regular normalization to the objective constraints that have both post-LP and post-heuristic RHS values as zero. As an example, Table 5 illustrates the calculation of normalization coefficient for Obj6 ($N_6$) with various normalization options:

TABLE 5

| | Zero RHS | | |
|---|---|---|---|
| Option Normalization | Unit | Reference RHS | Fixed |
| Unit | 1 | 1 | Fix Constraint |
| Smallest | 1/100 | 100/100 | Fix Constraint |
| Largest | 1/4500 | 4500/4500 | Fix Constraint |
| Mean | 1/1200 | 1200/1200 | Fix Constraint |
| Deviation | Fix Constraint | Fix Constraint | Fix Constraint |

Supply chain planner 110 calculates the final MIP objective function formulation and determines an optimized global hierarchical solution, as illustrated in Table 6:

TABLE 6

| MIP Formulation Option | Surplus_Minus_Slack | Surplus |
|---|---|---|
| MIP Objective Function | $\Sigma_{(I-1\ to\ 7)}\{(Ob\ Surplus_i - ObSlack_i) * H_i * N_i\}$ | $\Sigma_{(I-1\ to\ 7)}\{(Ob\ Surplus_i) * H_i * N_i\}$ |

Once an optimized global hierarchical solution has been generated, stored and communicated to one or more supply chain entities 120, the method ends. In addition, although, FIG. 5 illustrates one embodiment of a method of formulating a mixed integer program (MIP) to solve and restore the objective function hierarchy, various changes may be made to method 500 without departing from the scope of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a supply chain network comprising one or more supply chain entities that produce one or more products, comprising:
one or more buffers comprising one or more material storage and transition units;
one or more material operations;
a demand from the one or more supply chain entities for the one or more products; and
a planner, comprising a computer having a processor and a non-transitory computer readable medium, configured to generate a supply chain model wherein the one or more buffers are represented by nodes and the one or more material operations are represented by edges that connect the nodes, the planner further configured to:
divide a planning horizon of the generated supply chain model into one or more time buckets;
prioritize and model one or more business objectives as a hierarchy of objective functions;
automatically solve the hierarchy of objective functions by variable fixing;
automatically obtain an integer feasible solution of the hierarchy of objective functions; and
automatically obtain a global hierarchical solution; and
causing one or more of the supply chain entities to perform the one or more material operations to produce the one or more products, based at least in part, on the global hierarchical solution that satisfies the demand of the one or more supply chain entities.

2. The system of claim 1, wherein the planner obtains the integer feasible solution of the hierarchy of objective functions by:
sorting the one or more buffers from downstream to upstream;
calculating the time bucket-wise consumption and production profiles for the one or more time buckets from downstream time bucket to upstream;
processing a lot size and a resource setup;
checking for material availability from upstream to downstream for the one or more buffers;
determining a material and resource feasible integer solution; and
determining the global hierarchical solution.

3. The system of claim 2, wherein determining the global hierarchical solution comprises:
generating a model by:
fixing integer variables according to the material and resource feasible integer solution and solving for the topmost objective function;
converting hierarchical objective functions to constraints by adding slack and surplus variables;
introducing integer variables and integer constraints and calculating values for all the objective functions;
assigning one or more deviation-based normalization coefficients;
assigning one or more hierarchy-based objective coefficients;
grouping objective violation variables; and
assigning one or more intra-group objective coefficients; and
solving the model as a mixed integer problem.

4. The system of claim 3, wherein assigning hierarchy-based objective coefficients comprises:
calculating one or more objective coefficients as decreasing exponents of a fixed base; and
each of the one or more objective coefficients are a multiplication of a hierarchy coefficient and a normalization coefficient.

5. The system of claim 4, further comprising:
sources of materials comprising one or more of raw materials, inventory, work-in-progress, purchase orders and future procurements from one or more supply chain entities, the source of materials are represented as one or more nodes not having any upstream nodes;
customer orders for the one or more products are represented as one or more nodes not having any downstream nodes;
planned manufacturing operations are represented by one or more nodes having one or more upstream nodes and one or more downstream nodes; and
one or more inputs and one or more outputs are represented by edges.

6. The system of claim 5, wherein:
an edge between two buffer nodes represents processing of material and an edge between different time buckets for the same buffer represents inventory carried forward.

7. The system of claim 6, wherein the demand is one or more operational objectives of the one or more supply chain entities and comprises one or more of demand, safety stock limits, minimizing inventory, reducing backlog, obtaining a particular product mix, maintaining proportionality, reducing use of alternate items, and optimizing profit.

8. A computer-implemented method comprising:
generating a supply chain model of a supply chain network comprising one or more buffers comprising one or more material storage and transition units, one or more material operations, a demand from one or more supply chain entities for the one or more products, wherein the one or more buffers are represented by nodes and the one or more material operations are represented by edges that connect the nodes;
dividing a planning horizon of the generated supply chain model into one or more time buckets;
prioritizing and modeling one or more business objectives as a hierarchy of objective functions;
automatically solving the hierarchy of objective functions by variable fixing;
automatically obtaining an integer feasible solution of the hierarchy of objective functions;
automatically obtaining a global hierarchical solution; and
causing one or more supply chain entities to perform the one or more material operations to produce, the one or more products, based at least in part, on the global hierarchical solution that satisfies the demand of the one or more supply chain entities.

9. The computer-implemented method of claim 8, wherein obtaining the integer feasible solution of the hierarchy of objective functions comprises:
  sorting the one or more buffers from downstream to upstream;
  calculating the time bucket-wise consumption and production profiles for the one or more time buckets from downstream time bucket to upstream;
  processing a lot size and a resource setup;
  checking for material availability from upstream to downstream for the one or more buffers;
  determining a material and resource feasible integer solution; and
  determining the global hierarchical solution.

10. The computer-implemented method of claim 9, wherein determining the global hierarchical solution comprises:
  generating a model by:
    fixing integer variables according to the material and resource feasible integer solution and solving for the topmost objective function;
    converting hierarchical objective functions to constraints by adding slack and surplus variables;
    introducing integer variables and integer constraints and calculating values for all the objective functions;
    assigning one or more deviation-based normalization coefficients;
    assigning one or more hierarchy-based objective coefficients;
    grouping objective violation variables; and
    assigning one or more intra-group objective coefficients; and
  solving the model as a mixed integer problem.

11. The computer-implemented method of claim 10, wherein assigning hierarchy-based objective coefficients comprises:
  calculating one or more objective coefficients as decreasing exponents of a fixed base; and
  each of the one or more objective coefficients are a multiplication of a hierarchy coefficient and a normalization coefficient.

12. The computer-implemented method of claim 11, further comprising:
  representing, by the planner, as one or more nodes not having any upstream nodes, sources of materials comprising one or more of raw materials, inventory, work-in-progress, purchase orders and future procurements from one or more supply chain entities;
  representing, by the planner, as one or more nodes not having any downstream nodes, customer orders for the one or more products;
  representing, by the planner, as one or more nodes having one or more upstream nodes and one or more downstream nodes, planned manufacturing operations; and
  representing, by the planner, as edges, one or more inputs and one or more outputs.

13. The computer-implemented method of claim 12, wherein:
  representing, by the planner, as an edge between two buffer nodes, processing of material; and
  representing, by the planner, as an edge between different time buckets for the same buffer, inventory carried forward.

14. The computer-implemented method of claim 13, wherein the demand is one or more operational objectives of the one or more supply chain entities and comprises one or more of demand, safety stock limits, minimizing inventory, reducing backlog, obtaining a particular product mix, maintaining proportionality, reducing use of alternate items, and optimizing profit.

15. A non-transitory computer-readable medium embodied with, the software when executed using one or more computers is configured to:
  generate a supply chain model of a supply chain network comprising one or more buffers comprising one or more material storage and transition units, one or more material operations, a demand from one or more supply chain entities for the one or more products, wherein the one or more buffers are represented by nodes and the one or more material operations are represented by edges that connect the nodes;
  divide a planning horizon of the generated supply chain model into one or more time buckets;
  prioritize and model one or more business objectives as a hierarchy of objective functions;
  automatically solve the hierarchy of objective functions by variable fixing;
  automatically obtain an integer feasible solution of the hierarchy of objective functions;
  automatically obtain a global hierarchical solution; and
  cause the one or more supply chain entities to perform the one or more material operations to produce the one or more products, based at least in part, on the global hierarchical solution that satisfies the demand of the one or more supply chain entities.

16. The non-transitory computer-readable medium of claim 15, wherein obtaining the integer feasible solution of the hierarchy of objective functions comprises:
  sorting the one or more buffers from downstream to upstream;
  calculating the time bucket-wise consumption and production profiles for the one or more time buckets from downstream time bucket to upstream;
  processing a lot size and a resource setup;
  checking for material availability from upstream to downstream for the one or more buffers;
  determining a material and resource feasible integer solution; and
  determining the global hierarchical solution.

17. The non-transitory computer-readable medium of claim 16, wherein determining the global hierarchical solution comprises:
  generating a model by:
    fixing integer variables according to the material and resource feasible integer solution and solving for the topmost objective function;
    converting hierarchical objective functions to constraints by adding slack and surplus variables;
    introducing integer variables and integer constraints and calculating values for all the objective functions;
    assigning one or more deviation-based normalization coefficients;
    assigning one or more hierarchy-based objective coefficients;
    grouping objective violation variables; and
    assigning one or more intra-group objective coefficients; and
  solving the model as a mixed integer problem.

18. The non-transitory computer-readable medium of claim 17, wherein assigning hierarchy-based objective coefficients comprises:
  calculating one or more objective coefficients as decreasing exponents of a fixed base; and each of the one or more objective coefficients are a multiplication of a hierarchy coefficient and a normalization coefficient.

19. The non-transitory computer-readable medium of claim 18, wherein the software is further configured to:
represent one or more nodes not having any upstream nodes, sources of materials comprising one or more of raw materials, inventory, work-in-progress, purchase orders and future procurements from one or more supply chain entities;
represent as one or more nodes not having any downstream nodes, customer orders for the one or more products;
represent as one or more nodes having one or more upstream nodes and one or more downstream nodes, planned manufacturing operations; and
represent as edges, one or more inputs and one or more outputs.

20. The non-transitory computer-readable medium of claim 19, wherein the software is further configured to:
represent as an edge between two buffer nodes, processing of material; and
represent as an edge between different time buckets for the same buffer, inventory carried forward.

* * * * *